3,303,164
SYNTHETIC RESINS FROM TRI(ALKYLIDENE) HEXITOLS AND PHENOLS
Daniel Shew, Metuchen, and Henry B. Lange, Westfield, N.J., assignors to Merck & Co., Inc., Rahway, N.J., a corporation of New Jersey
No Drawing. Filed Nov. 23, 1960, Ser. No. 71,161
3 Claims. (Cl. 260—47)

This invention relates to novel resins and methods for their preparation as well as useful compositions comprising these resins. More particularly, this invention relates to the polymerization products of polyalkanol acetal monomers and phenolic monomers. Specifically, this invention relates to polymerization products of tri(lower alkylidene)hexitol monomers and phenolic monomers, compositions which contain the aforementioned polymerization products and methods for preparing these polymerization products.

Transparent resins and opaque resins of the type described herein having the combination of physical properties of the polymerization products of this invention which can be made from relatively cheap materials have not been described.

It is therefore an object of this invention to provide a resin which has desirable physical properties and which is made from relatively cheap and readily obtainable materials.

A further object of this invention is to provide a process for the production of polymerization products of phenolic monomers and polyalkanol acetal monomers, which polymerization products have desirable physical properties.

Further objects will be apparent from the detailed disclosure provided herein.

In accordance with the present invention, it has now been found that polymers having improved physical properties may be prepared from tri(lower alkylidene)hexitols and phenolic compounds under certain specific conditions. Water insoluble resins are prepared by reacting together tri(lower alkylidene)hexitol with a phenolic compound such as phenol, resorcinol, alkyl phenols, aryl phenols, aralkyl phenols and alkaryl phenols. The molar ratio of the phenolic compounds to the tri(lower alkylidene)hexitol compound should be in the range of from about 1:1 up to about 3:1. Examples of tri(lower alkylidene)hexitol compounds which may be used in the practice of this invention are 1,3:2,4:5,6-trimethylene-D-sorbitol; and 1,3:2,5:4,6-trimethylene-D-mannitol and other triacetals prepared by reacting hexitols with varying aldehydes. Examples of phenolic compounds which may be used in the practice of this invention are phenol, resorcinol, methyl phenol, propyl phenol, heptyl phenol, nonyl phenol, p-phenyl phenol, p-(2-methyl phenyl) phenol, p-(phenyl methyl) phenol and p-(2-methyl-4-chlorophenyl) phenol. The phenolic compound and the tri(lower alkylidene)hexitol compound should preferably be reacted in the presence of a catalyst. Such catalysts are acid catalysts such as sulfuric acid, p-toluene sulfonic acid, diphenyl disulfonic acid; acyl halides such as adipoyl chloride, boron trifluoride and metal halides such as titanium trichloride. The reaction may take place under either anhydrous or hydrous conditions. The reaction should preferably be carried out at a temperature above 90° C., and desirably in the range of from 90° C. up to 180° C. The most preferable temperature range for the reaction to take place is at the range of from about 120° C. up to about 140° C. The time of reaction is dependent upon the catalyst used and the desired physical properties of the polymer. It is usual that a reaction time of at least 10 minutes is necessary where the reaction temperature is in the preferred range of 120° C. up to 140° C. The ratio of reactants is preferably in the range of from about 1:1 in to about 3:1, is was mentioned heretofore. However, to attain the optimum physical properties of the polymers of this invention, it is preferred that the ratio of phenolic compound to tri(lower alkylidene) hexitol compound should be in the range of from about 2:1 up to 2.3:1. Prior to gelation, the resin may be poured into molds. The curing of the resin thus formed, after gelation, is preferably carried out in a mold at an atmospheric pressure and at a temperature of between 120° C. and 140° C. for a period of approximately 2 hours to 4 hours.

The tri(lower alkylidene)hexitols used as reactants in this invention may be prepared by reacting an alkyl aldehyde with a suitable hexitol. The method of preparation may be found in an article by A. T. Ness et al., Journal of the American Chemical Society, 65, 2215 (1943).

In one embodiment of the present invention, two moles of a tri(lower alkylidene)hexitol, such as 1,3:2,4:5,6-trimethylene-D-sorbitol, are mixed with a catalyst such as p-toluene sulfonic acid or titanium trichloride and four moles of a phenolic compound such as phenol at a temperature of 25° C. The resulting mixture is heated to a temperature between 100° C. and 120° C. and is maintained at 120° C. while being stirred. The catalyst may also be incorporated into the mixture during the heat-up period, or immediately after the temperature reaches 120° C. The resulting resin syrup is then cooled to 25° C. The resulting reaction mass at 25° C. solidifies having a transparent appearance. If the reaction mass is heated at a temperature of 120° C. for a period of four hours, an infusible, insoluble resin is obtained. This resin is transparent and amber in color. Typical ranges of physical properties of a resin prepared in the above manner are as follows:

Dielectric constant _____ 12–14
Barcol hardness (934–1 scale) _____ 10–50
Compressive strength _____p.s.i__ 15,000–24,000
Tensile strength _____p.s.i__  6,000–7,000
Flexural strength _____p.s.i__  3,000–12,000
Temperature of distortion (264 p.s.i load)_° C.__50–130

The physical properties are dependent upon the formulation of the resin and conditions of cure. The physical properties were determined using the following ASTM tests:

(1) Compressive Properties of Rigid Plastics, ASTM designation D695–54.
(2) Tensile Properties of Plastics, ASTM designation D638–58T.
(3) Flexural Properties of Plastics, ASTM designation D790–58T.
(4) Deflection Temperature of Plastics Under Load, ASTM designation D648–56.
(5) A.C. Capacitance, Dielectric Constant, and Loss Characteristics of Electrical Insulation Materials, ASTM designation D150–54T.

The resins of this invention may be combined with various conventional ingredients, if desired. Such ingredients will modify the physical and chemical properties of the resin in several manners. Variations of the quantities of these ingredients in proportion to the amount of basic resin will bring about a variation in the end properties of the resultant composition. Such additions may include fillers, plasticizers, lubricants and pigments. Example of fillers compatible with the resins of this invention are finely divided silicon dioxide, mica, aluminum powder.

The resins of this invention are members of a class of thermoplastic and thermosetting resins which are insoluble in various solvents such as water, ether, chloroform and benzene. The physical properties such as modulus, hardness, compressive strength, tensile strength and flexural strength of members of this class of resins are dependent upon the particular reactants used to form the polymerization products of this invention, the conditions of reaction, the curing time and the proportion of the reactants used. The resins of this invention may be opaque or transparent, these properties also depending upon the conditions of reaction and the proportions of the reactants used.

There is a unique advantage in preparing the resins of this invention in that no external pressure is required, and no volatile material is evolved during the formation or the curing of the resin. The resins, in cured form, exhibit good physical and chemical properties such as a high heat distortion point, high flexure strength, high compressive strength, high tensile strength, good resistance to acids, and solvents and high resistance to oxidation. The resins of this invention can be advantageously used in electrical potting and encapsulating materials, fiberglass reinforced pipes, laminates, adhesives and tooling compounds.

The invention will be further illustrated by the following specific examples, but it will be understood that the invention is not limited thereby.

Example 1

Forty-three parts by weight of phenol, 31 parts by weight of 1,3:2,4:5,6-trimethylene-D-sorbitol and 0.2 part by weight of p-toluene sulfonic acid were mixed in a glass vessel at a temperature of 25° C. The resulting mixture was then heated to a temperature of 110° C. and was maintained at a temperature of 110° C. for a period of one hour to form a resin syrup. A portion of the resin syrup was cooled to a temperature of 25° C. At this temperature it solidified to a pink transparent glass-like material. The second portion was heated at a temperasure of 130° C. for a period of three hours. At the end of this period an infusible, insoluble resin formed. This infusible resin had a milk-white color. It had a Barcol hardness (935 scale) of 50.

Example 2

The trimethylene sorbitol used in Example 1 was micropulverized whereby the average particle size was approximately 0.10 micron. Fifty-eight parts by weight of the micropulverized trimethylene sorbitol was added to a mixture of 50 parts by weight of phenol and 0.1 part by weight of concentration (98%) sulfuric acid. The resulting mass was mixed at a temperature of 33° C. in a glass vessel. The mixture was then heated to a temperature of 90° C. The reaction mass was kept at a temperature of 90° C. for a period of ten minutes. It was then heated to 105° C. and was maintained at 105° C. for a period of one hour. The resin was then cooled to room temperature. After cooling the resin was cured at 124° C. for a period of three hours. The cured resin had the following physical properties:

Color (translucent) _____ Amber
Compressive strength _____p.s.i__ 24,000
Tensile strength _____p.s.i__ 6,800

Example 3

Forty-two parts by weight of phenol, 57.2 parts by weight of trimethylene sorbitol, which was micropulverized as in Example 2, and 0.1 part by weight of sulfuric acid were mixed at a temperature of 30° C. in a glass vessel. The resulting mixture was heated to a temperature of 30 C. and maintained at that temperature for a period of 20 minutes. The heated mixture was poured into standard ASTM molds. The resin was cured in the molds for a period of two hours at a temperature of 120° C. After curing, the resin had the following properties:

Barcol hardness (935 scale) _____ 68–70
Tensile strength _____p.s.i__ 6,400
Compressive strength _____p.s.i__ 22,750
Flexural strength _____p.s.i__ 8,650
Heat distortion (temperature
  264 p.s.i. load) _____° C__ 50

Example 4

Forty parts by weight of phenol, 45.8 parts by weight of 1,3:2,5:4,6-trimethylene-D-mannitol and 0.09 part by weight of concentrated sulfuric acid were mixed in a glass reactor at a temperature of 30° C. The resultant mixture was heated to a temperature of 140° C. and maintained at that temperature for a period of 30 minutes. The resulting resin syrup was maintained at a temperature of 120° C. for a period of 16 hours, after pouring into molds of the type used in Example 3. Curing was carried out. The cured resin had the following physical properties:

Color _____ Deep amber
Barcol hardness (934–1) _____ 33
Heat distortion temperature (264 p.s.i. load)
                                             ° C__ 127
Flexural strength _____p.s.i__ 11,800

Example 5

Thirty-five parts by weight of phenol, 27 parts by weight of trimethylene sorbitol of the type used in Example 2, 27 parts by weight of 1,3:2,5:4,6-trimethylene-D-mannitol and 0.09 part by weight of concentrated sulfuric acid were mixed at a temperature of 33° C. The resulting mixture was heated while stirring in a glass vessel to a temperature of 133° C. The reaction mass was maintained at 133° C. for a period of 30 minutes. The resulting resin syrup was then poured into molds using the same procedure as in Example 3. While in the molds, the resin was cured at a temperature of 120° C. for a period of three hours. The cured resin had the following physical properties:

Barcol hardness (934–1) _____ 22–24
Flexural strength _____p.s.i__ 3,500

Example 6

Thirteen parts by weight of p-cresol, 13 parts by weight of trimethylene sorbitol of the type used in Example 1 and 0.1 part by weight of p-toluene sulfonic acid were mixed in a glass vessel at a temperature of 33° C. The resultant mixture was then heated to 135° C. and maintained at that temperature for a period of three hours. The resultant syrup was cooled and a fusible type resin which melted at 110° C. was removed from the glass vessel. This type resin can be cast into various shapes.

Example 7

Twenty parts by weight of trimethylene sorbitol of the type used in Example 1 and 13 parts by weight of phenol were mixed in a cylindrical glass vessel at 30° C. The resultant mixture was heated to a temperature of 140° C. 0.8 part by weight of titanium trichloride were added to the reaction mass. The reaction mass was maintained at a temperature of 140° C. for a period of 30 minutes. The resultant resin syrup was then poured into molds. The resin was cured in these molds for a period of two hours at a temperature of 140° C. The resultant resin formed by this procedure was found to be infusible.

Example 8

Sixty-nine parts by weight of phenol were mixed with 0.71 part by weight of sulfuric acid to form a solution. To the solution 73 parts by weight of trimethylene sorbitol of the type used in Example 1 was added. The mixture was then stirred in a glass vessel and heated to a temperature of 115° C. The resultant reaction mass was maintained at a temperature of approximately 120° C. for a period of 30 minutes. Two parts by weight of dinitrocarbanilide was then added to the resin syrup. The resultant mixture was then stirred and then poured into molds of the type used in Example 3. The molds were then placed in a circulating air oven which operated at a temperature of 140° C. The curing period was three hours. The cured material had a Barcol hardness (935 scale) of 65.

*Example 9*

A resin syrup was produced by the procedure used in Example 8. To the resin syrup two parts by weight of aluminum powder were added. The resulting mixture was then placed in molds and cured under the same conditions as in Example 8. The resulting cured resin had a Barcol hardness (935 scale) of 35.

*Example 10*

An experiment was carried out using the procedure similar to that used in Example 9 with the exception that a filler of silicon dioxide was used instead of aluminum. The percent of silicon dioxide used was 4%. The cured resin had the following physical properties:

| | |
|---|---|
| Barcol hardness (935 scale) | 85 |
| Dielectric constant | 12.6 |
| Dissipation factor | 0.4 |

The silicon dioxide used herein is Cab-o-sil-M5. It is manufactured by Godfrey L. Cabot, Inc., of Boston, Massachusetts. It has the following physical properties:

| | |
|---|---|
| Particle size range, microns | 0.015–0.020 |
| Surface area (nitrogen adsorption), sq. meters per gram | 175–200 |
| Specific gravity | 2.1 |
| Apparent bulk density, lbs. per cubic foot | 2.5–3.5 |

The above description and examples are intended to be illustrative only. Any modification of or variation therefrom which conforms to the spirit of the invention is intended to be included within the scope of the claims.

What is claimed is:

1. A resin constituting of the co-polymerization product of trimethylene sorbitol or trimethylene mannitol with phenol or p-cresol, the mole ratio of the sorbitol or the mannitol to the phenol or p-cresol being between about 1:1 and 1:3, the product being produced at a temperature of above 90° C.

2. The resin of claim 1 wherein the product is formed from 1,3:2,4:5,6-trimethylene-D-sorbitol and phenol.

3. The resin of claim 1 wherein the product is formed from 1,3:2,5:4,6-trimethylene-D-mannitol and phenol.

References Cited by the Examiner

UNITED STATES PATENTS

| | | | |
|---|---|---|---|
| 2,268,126 | 12/1941 | Orthner et al. | 260—47 |
| 2,433,852 | 1/1948 | Lieber | 260—47 |
| 2,902,470 | 9/1959 | Kress | 260—67 X |
| 2,915,498 | 12/1959 | Kraft | 260—47 |
| 2,971,936 | 2/1961 | Dubien et al. | 260—47 |
| 3,197,435 | 7/1965 | Ronay et al. | 260—58 |

OTHER REFERENCES

Ellis: "The Chemistry of Synthetic Resins" (combined vols. I and II), p. 333, Reinhold Pub. Corp., New York, 1935.

Ness et al.: Journal of the American Chemical Society, 65, 2215–2222 (1943).

WILLIAM H. SHORT, *Primary Examiner.*

M. STERMAN, A. SULLIVAN, H. D. ANDERSON, T. D. KERWIN, J. E. DEMPSEY, *Assistant Examiners.*

UNITED STATES PATENT OFFICE
CERTIFICATE OF CORRECTION

Patent No. 3,303,164                                February 7, 1967

Daniel Shew et al.

It is hereby certified that error appears in the above numbered patent requiring correction and that the said Letters Patent should read as corrected below.

Column 6, line 6, for "constituting" read -- consisting --.

Signed and sealed this 10th day of October 1967.

(SEAL)
Attest:

Edward M. Fletcher, Jr.

Attesting Officer

EDWARD J. BRENNER

Commissioner of Patents